Patented Jan. 2, 1940

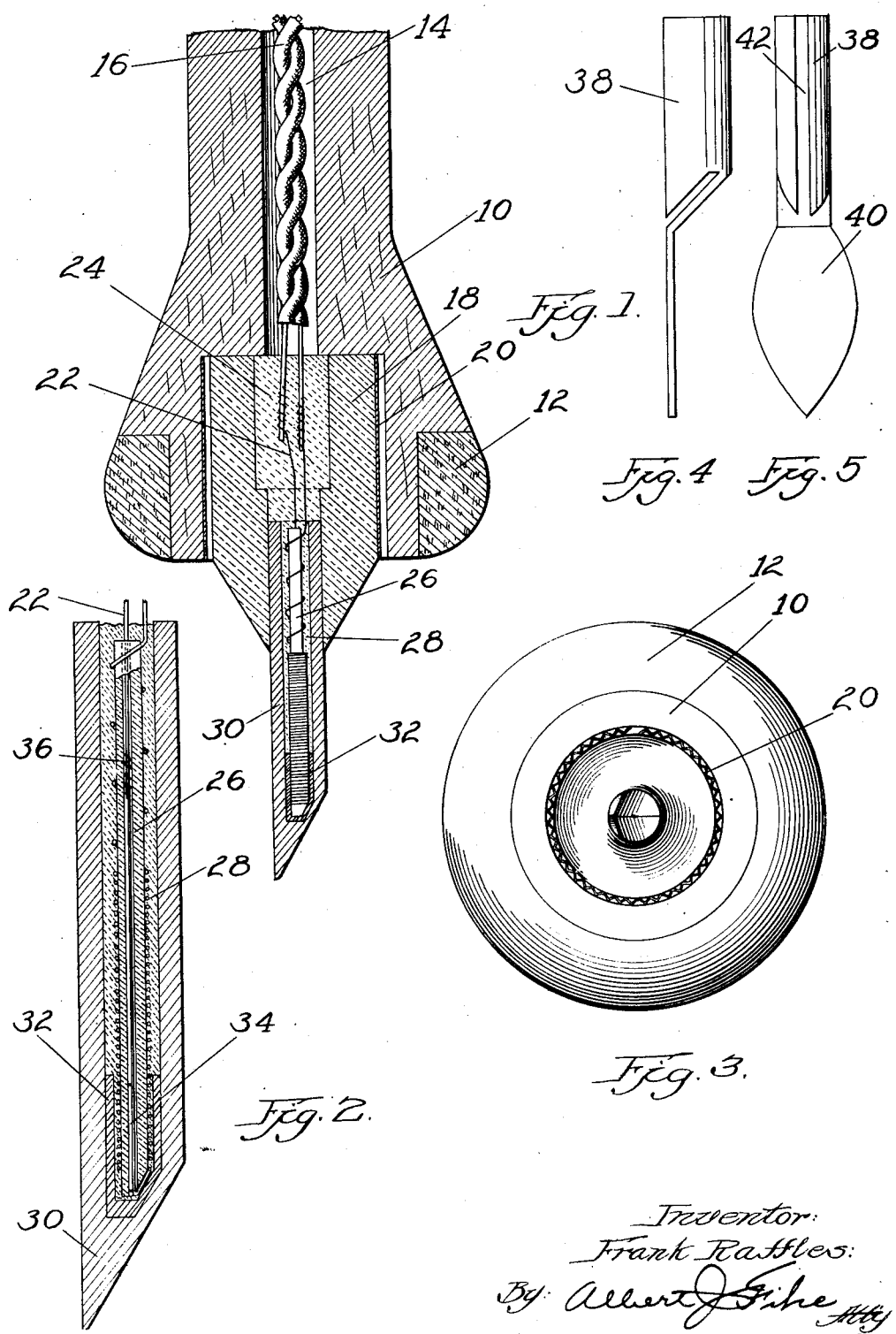

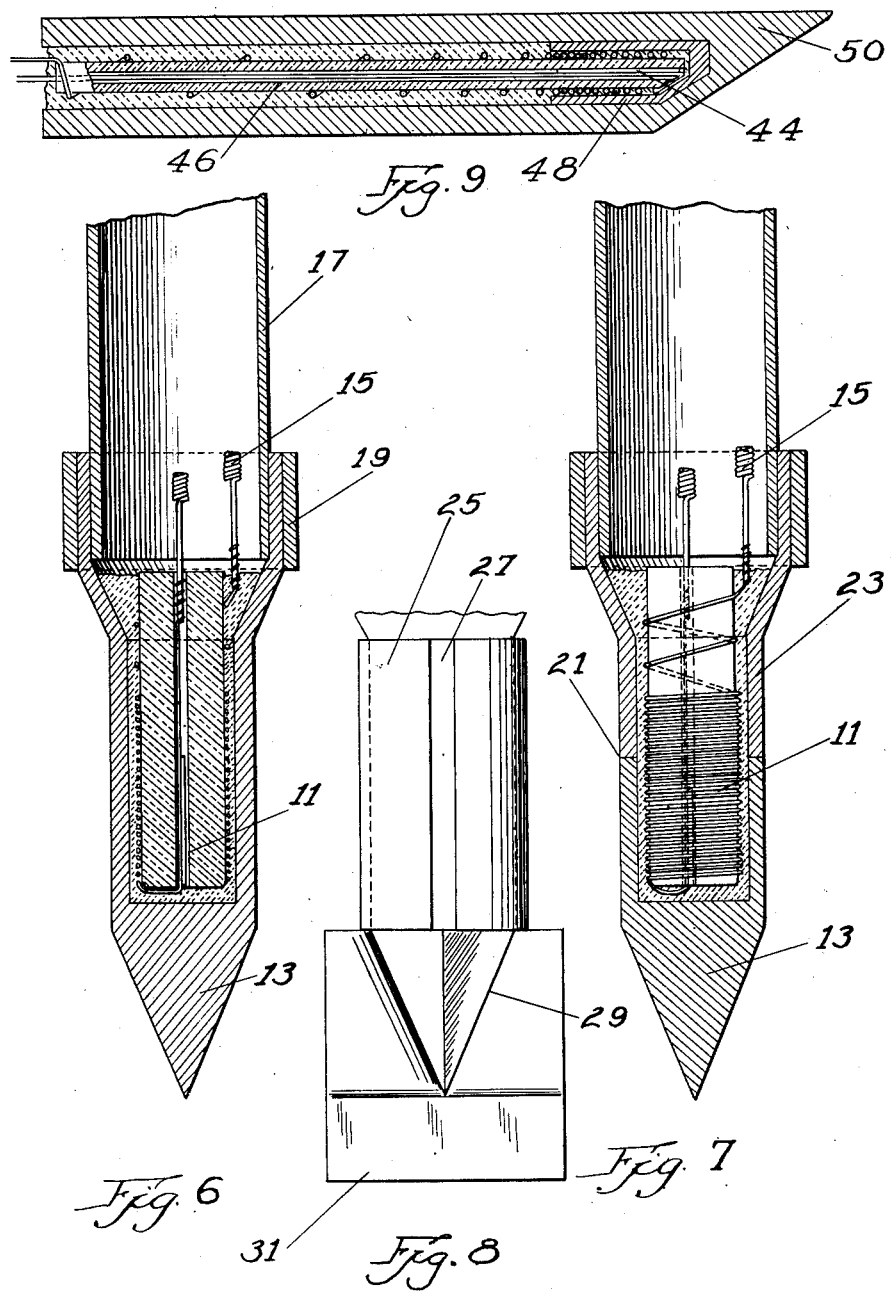

2,185,266

UNITED STATES PATENT OFFICE 2,185,266

HEATING DEVICE FOR PYROGRAPHY AND SOLDERING IRON

Frank Raffles, Chicago, Ill.

Application July 3, 1935, Serial No. 29,616

7 Claims. (Cl. 219—26)

This invention relates to an improved heating device for pyrography and soldering iron, and the present application constitutes a continuation in part of this same applicant's prior application for patent on Heating element, filed February 3, 1934, Serial No. 709,639.

One of the important objects of this invention is to provide an improved heating device which can be used for pyrography such as the burning of letters, designs or the like into wood, leather, rubber, and other materials, and which produces an even flow of heat, thereby preventing constant scorching or burning. The device can also be used by dentists, as, for example, in smoothing wax impressions and also, with slight modifications, as a soldering iron. The original device or attachments can further be employed in woodworking such as the finishing of furniture which includes the melting of shellac and the like into holes or depressions in the wood or furniture. Another feature is the use of a device of this type or an attachment therefor as a tire groover; for example, in finishing repaired or vulcanized casings and cutting grooves therein to simulate or correspond with the design or tread of the original new tire. In fact, the device is especially adapted for use wherever an intense localized heat is desired or necessary.

Another important improvement in the device of this invention over the prior art, is the provision of means for carrying heat directly to the desired or most important portions of the apparatus, while at the same time carrying heat away from unimportant or undesirable parts of the device.

Another object is the provision of a metal tip for the heating device of this invention which shall be composed of a non-oxidizable material and of alloy which has a high heat conductivity.

A still further improvement is the provision of temperature equalizing means in the winding of the resistance coils. A further important object is to provide a renewal or replaceable tip, particularly in the soldering iron of this invention.

A still further object is the insertion of a special type of heat conducting alloy at or near the end of the heating element and between it and the working tip of the apparatus. Another still further important object is to provide a particular form of winding for the resistance element, whereby the equalization of the heat distribution will result and greater operating efficiency will be produced.

Another feature of the particular devices of this invention is the employing of a novel and improved refractory cement in the heating element itself which does not decompose and become a conductor of electricity even at the rather high temperatures produced in the element of this invention. This accordingly eliminates breakdowns.

Further objects are the elimination of weak soldering joints, the provision of heating element and special type of winding of insulating material whereby constant heat is always available at any fixed voltage, such as 110 or 220 volts, the use of an elastic ferrule for the handle, and a special type of heat insulating handle for certain types of this apparatus.

Other and further important objects of the invention will be apparent from the disclosures in the accompanying drawings and following specification.

The invention, in a preferred form, is illustrated in the drawings and hereinafter more fully described.

In the drawings:

Figure 1 is a sectional view of one of the improved heating devices of this invention showing the pencil-style handle therefor.

Figure 2 is a still further enlarged sectional view of the heating element itself and the surrounding metal tip.

Figure 3 is a bottom or end view of the device.

Figure 4 is a side elevation of an attachment or special tool adapted to be used with this heating device.

Figure 5 is a plan view of this tool or attachment.

Figure 6 is a sectional view showing an adaptation of the heating element for heavier work such as soldering or the like.

Figure 7 is a view similar to Figure 6 showing the exterior construction of the heating element per se, and illustrating a slight modification.

Figure 8 is a plan view of an attachment or appurtenance adapted to be used with the soldering iron of Figures 6 and 7.

Figure 9 shows a preferred form of heating element as shown in the drawings:

The reference numeral 10 indicates generally the handle of the improved heating tool of this invention, the same being of any desired shape and preferably having a further insulating portion or support 12 adapted to be grasped by the fingers of the operator. Passage 14 extends longitudinally through the handle for the reception of current carrying wires 16.

Mounted in a recess in the lower end of handle 10 is a porcelain or other insulating support 18 which is somewhat cylindrical in shape and is mounted in the handle 10 by means of an elastic metal ferrule or the like 20, which securely locks into the material of the handle and grips the portion with constant pressure.

The wires 16 extend downwardly into the porcelain support 18 and resistance wires 22 are fastened thereto, as best shown in Figure 1, these joints then being imbedded in porcelain or other cement 24.

The resistance wires are thence led downwardly, one into and the other around a support 26 composed of porcelain or other suitable refractory material. This construction is best shown in Figure 2.

It will be noted that the resistance wire is wound unequally around the porcelain 26, the winding being more close at the ends, with the turns wider apart at the middle, thereby giving an equalization of heat throughout the length of the element. With uniform distribution of winding the middle of the coil will be much hotter than the ends and the wire or insulation will be much more likely to break down prematurely. The windings are imbedded in insulating cement or the like 28 and the whole is positioned inside a tip 30 which is composed of a non-oxidizable metal such as nickel silver and which has a relatively low cost. However, a high heat conducting insert or lining 32 which is composed of silver or the like is interposed between the lower end of the winding of the wire 22 by a porcelain rod or core 26, the metal working tip thence being for the purpose of conducting heat toward the tip and away from the handle.

From an inspection of Figure 2 it will be noted that a short metal rod 34 is inserted at the lower end of the passage through the porcelain core 26 and against the corresponding portion of the wire 22, this comprising a temperature equalizing rod which is a heavier section than the resistance wire on that portion of the core and which further acts to conduct the heat away from the interior of the core to the working point of the instrument.

It will be noted that a short heavy wire 34 comprising a temperature equalizer is at the lowermost or outer end of the porcelain tube 26 and there is also provided a center pin 36 at the upper or inner end of the porcelain tube or core, which does not extend all the way through, leaving an air gap which extends entirely throughout the middle portion of the opening in the core 26, thereby preventing any great amount of heat from being conducted up through this center wire or pin toward the handle. The temperature generated in that portion of the resistance wire running through the center of the core 26 is likely to become excessive since it cannot escape by radiation, due to the high temperature by which it is surrounded. The particular construction herein described and shown in Figure 2 greatly increases the efficiency of the instrument by conducting this high temperature which is on the inside of the rod 26 directly to the working part of the tool and preventing this heat from being carried up toward the handle.

As shown in Figures 4 and 5 a metallic attachment or attachments can be provided for the tip 30, these being in the form of spring clip elements 38 in sleeve like form and adapted to be slipped over the corresponding portion of the tip and terminating in some suitable tool element 40, such as a spatula or the like. It will be noted that the sleeve 38 is split as at 42 so as to take advantage of the resiliency of the metal to provide a tight gripping and heat conducting contact between the tip 30 and the attachment itself. Attachments of this sort can be used in many arts, such as by dentists or for various other purposes which might suggest themselves.

As shown in Figures 6 and 7, an adaptation or modification is imbodied in the soldering iron which has a heating element 11 imbodied in a copper tip 13 to supply high heat conductivity. This compares favorably with an ordinary soldering iron in which the heating element is removed from the tip and generated heat must be conducted to the tip, with a considerable loss of efficiency.

It will be noted that the resistance wires from the heating element are connected to heavier lead-in wires and the heavier lead-in wires are provided with spring pig tails 15 for joining with the leads, thereby eliminating weak soldering joints.

The handle itself is composed of a steel tubular shank 17 and the copper tip 13 is force-fitted over the end of the shank 17 and reinforced by a steel ferrule 19 pressed over the upper portion of the copper tip. This ferrule not only adds strength to the joint, but also protects the copper from corrosion. In Figure 7 a slight modification is shown wherein the tip has its outer end 13 composed of one metal, having higher heat conductivity such as copper, and having its upper portion 23 composed of metal or the like having lower heat conductivity than copper, such as steel or brass, the two portions welded or brazed together at 21. This construction is more economical than a one piece copper tip and also results in retaining heat at the tip and keeping it away from the handle to a considerable extent.

As illustrated in Figure 8, working attachments may be provided for this soldering iron or heating element, same being along the same lines as those shown in Figures 4 and 5, comprising essentially a cylindrical spring clip element 25 split at 27 for resilient gripping contact and recessed at 29 to conform to the contour of tip 13 and terminating in a plate or tool-like attachment 31, which obviously can be of any desired shape, size, design or material. These attachments can be used in various arts and for different purposes wherever the application of heat of a desired degree through convenient or special form of tool is desirable.

As shown in Figure 9, a preferred construction of the heating element of this invention embodies a special type of winding on a porcelain core 46, the high resistance wire being brought out from the interior longitudinal passage of the core at the end and wound with fairly wide spacings for a short distance adjacent the end and then with very close spacings for another short distance approximately the same as that of the first winding and extending up to the inner limit of the silver tip 48 which is applied around the end of the heating element for a better conductivity. Beyond this point, the wire is wound with gradually increasing distances between the windings as shown so that the greatest portion of the heat will be concentrated within the enclosure defined by the silver tip 48 and accordingly transmitted directly to the tip 50 of the operating end of the structure. The fairly wide spaced windings at the end have been found by experiment to avoid short circuits while, at the same time, giving even and higher temperatures than if the openings were all spaced quite closely at the end and within the enclosure of the silver tip. The temperature equalizing rod 44 is, of course, employed in this construction.

It will also be evident that instead of having attachments for various operations, such as the tire groover, dental wax melter or shellac applicator, the heating devices themselves may be shaped for these particular purposes, thereby eliminating the necessity of attachments.

I am aware that many changes may be made and numerous details of construction varied throughout a wide range without departing from the principles of this invention, and I, therefore, do not purpose limiting the patent granted hereon, otherwise than as necessitated by the prior art.

I claim as my invention:

1. A heating element including an insulating tube and high resistance wire passing through the tube and extending out of the end thereof and thence being wound around the exterior of one end of the tube, and refractory cement surrounding the wire and maintaining the same in position on the tube, and a temperature equalizing rod of a heavier section than the wire in that end of the tube adjacent the windings, together with a center pin in the other end of the tube adjacent the resistance wire, the center pin and temperature equalizing rod terminating short of the center of the tube and providing an air gap therein and a metal tube in which said heating element is positioned, the end of said metal tube being beveled, and a corresponding bevel at the end of the support for the resistance wire.

2. A heating element including an insulating tube and high resistance wire passing through the tube and extending out of the end thereof and thence being wound around the exterior of one end of the tube, and refractory cement surrounding the wire and maintaining the same in position on the tube, and a temperature equalizing rod in that end of the tube adjacent the windings, a center pin in the other end of the tube adjacent the resistance wire, the center pin and temperature equalizing rod terminating short of the center of the tube and providing an air gap therein, a metal casting comprising a working tip surrounding the heating element with its refractory cement, the openings adjacent one end of the core being fairly closely spaced and the windings just beyond this end being very closely spaced.

3. A heating element, including an insulating tube, a high resistance wire passing through the tube and extending out of the end thereof and terminating in windings around the exterior of said tube end, the windings adjacent one end of the core being fairly closely spaced and the windings just beyond this end being very closely spaced, and further windings along the middle and toward the other end of the tube, said last-named windings being of gradually increasing distances apart, together with a refractory cement surrounding the wire and maintaining the same in position on the support, and insulating each coil from adjacent coils, and a metal tube in which said heating element is positioned, said metal tube being of a high heat conductivity and non-oxidizable.

4. A heating element including an insulating tube and high resistance wire passing through the tube and extending out of the end thereof and thence being wound around the exterior of one end of the tube, the windings adjacent one end of the core being fairly closely spaced and the windings just beyond this end being very closely spaced, and a metal housing inclosing the heating element together with a sleeve of a metal of a higher heat conductivity between the end of the metal housing and the corresponding end of the heating element, a temperature equalizing rod in that end of the core adjacent the closely spaced windings, and refractory cement surrounding the wire and maintaining the same in position on the tube, and a temperature equalizing rod in that end of the tube adjacent the windings, a center pin in the other end of the tube adjacent the resistance wire, the center pin and temperature equalizing rod terminating short of the center of the tube and providing an air gap therein, a metal casting comprising a working tip surrounding the heating element with its refractory cement, and means for conducting and concentrating heat at the outer end of the working tip.

5. A heating element including an insulating tube and high resistance wire passing through the tube and extending out of the end thereof and thence being wound around the exterior of one end of the tube, and refractory cement surrounding the wire and maintaining the same in position on the tube, and a temperature equalizing rod in that end of the tube adjacent the windings, a center pin in the other end of the tube adjacent the resistance wire, the center pin and temperature equalizing rod terminating short of the center of the tube and providing an air gap therein, a metal casting comprising a working tip surrounding the heating element with its refractory cement, and means for conducting and concentrating heat at the outer end of the working tip, said means comprising a lining of a metal of a very high heat conductivity between the hottest end of the heating element and the metal working tip.

6. A heating element including an insulating tube and high resistance wire passing through the tube and extending out of the end thereof and thence being wound around the exterior of one end of the tube, and refractory cement surrounding the wire and maintaining the same in position on the tube, and a temperature equalizing element in that end of the tube adjacent the windings, a center pin in the other end of the tube adjacent the resistance wire, the center pin and temperature equalizing element terminating short of the center of the tube and providing an air gap therein, a metal casting comprising a working tip surrounding the heating element with its refractory cement, and means for conducting and concentrating heat at the outer end of the working tip, said means comprising a lining of silver between the hottest end of the heating element and the metal working tip.

7. A heating element including an insulating tube and high resistance wire passing through the tube and extending out of the end thereof and thence being wound around the exterior of one end of the tube, and refractory cement surrounding the wire and maintaining the same in position on the tube, and a temperature equalizing element in that end of the tube adjacent the windings, a center pin in the other end of the tube adjacent the resistance wire, the center pin and temperature equalizing element terminating short of the center of the tube and providing an air gap therein, a metal casting comprising a working tip surrounding the heating element with its refractory cement, and means for conducting and concentrating heat at the outer end of the working tip, said means comprising a lining of a metal of a very high heat conductivity between the hottest end of the heating element and the metal working tip, said high heat conductivity element composed of silver and partially replacing the insulating cement at this point.

FRANK RAFFLES.